United States Patent
Kim et al.

(10) Patent No.: US 9,729,461 B2
(45) Date of Patent: Aug. 8, 2017

(54) METHOD AND APPARATUS FOR TRANSMITTING VOIP FRAME

(71) Applicant: Samsung Electronics Co., Ltd., Gyeonggi-do (KR)

(72) Inventors: Tae-Jun Kim, Seoul (KR); Sung-Hoon Kim, Gyeonggi-do (KR); Young-Jip Kim, Gyeonggi-do (KR); Joon-Sung Chun, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 95 days.

(21) Appl. No.: 14/638,729

(22) Filed: Mar. 4, 2015

(65) Prior Publication Data
US 2015/0256427 A1    Sep. 10, 2015

(30) Foreign Application Priority Data
Mar. 4, 2014    (KR) .................. 10-2014-0025352

(51) Int. Cl.
| | |
|---|---|
| *H04L 12/54* | (2013.01) |
| *H04L 12/875* | (2013.01) |
| *H04L 29/06* | (2006.01) |
| *H04M 3/00* | (2006.01) |
| *H04L 12/853* | (2013.01) |
| *H04L 12/841* | (2013.01) |

(52) U.S. Cl.
CPC ........ *H04L 47/562* (2013.01); *H04L 47/2416* (2013.01); *H04L 47/283* (2013.01); *H04L 65/00* (2013.01); *H04M 3/00* (2013.01)

(58) Field of Classification Search
CPC .. H04L 47/50; H04L 47/56; H04L 2012/5681
USPC .................. 370/428, 429, 458, 498
See application file for complete search history.

(56) References Cited

U.S. PATENT DOCUMENTS

| | | | | |
|---|---|---|---|---|
| 6,434,606 | B1 * | 8/2002 | Borella | H04J 3/0632 709/214 |
| 6,728,209 | B2 * | 4/2004 | Pate | H04L 12/5601 370/230.1 |
| 6,757,284 | B1 * | 6/2004 | Galles | H04L 49/552 370/394 |
| 6,865,162 | B1 * | 3/2005 | Clemm | G10L 19/005 370/286 |
| 7,039,059 | B2 * | 5/2006 | Mizusawa | H04M 7/125 370/235 |
| 7,330,461 | B2 * | 2/2008 | Windecker | H04L 12/66 370/352 |

(Continued)

FOREIGN PATENT DOCUMENTS

KR    10-090661511    12/2006

*Primary Examiner* — Dmitry H Levitan

(57) ABSTRACT

A method for transmitting a Voice over Internet Protocol (VoIP) by a wireless LAN Access Point (AP) in a communication system includes when a VoIP frame is input from a terminal, determining whether a buffer for eliminating a jitter generated in a wireless network is used, and storing the VoIP frame in a queue, determining whether the buffer is used, and when the buffer is used, determining a time interval for transmitting the VoIP frame stored in the queue and a service start time, and transmitting the VoIP frame stored in the queue in a wired fashion based on the determined time interval and service start time.

14 Claims, 4 Drawing Sheets

(56) References Cited

U.S. PATENT DOCUMENTS

| | | | | |
|---|---|---|---|---|
| 7,817,677 | B2* | 10/2010 | Black | G10L 19/005 370/516 |
| 7,826,466 | B2* | 11/2010 | Patella | H04B 3/54 370/412 |
| 7,944,949 | B2* | 5/2011 | Subrahmanyan | H04J 3/062 370/516 |
| 8,831,001 | B2* | 9/2014 | Klimker | H04L 65/605 370/392 |
| 9,043,909 | B2* | 5/2015 | Thomas | H04L 63/0227 726/11 |
| 9,088,630 | B2* | 7/2015 | Gupta | H04L 65/4061 |
| 9,172,914 | B1* | 10/2015 | Wheelock | H04N 21/42676 |
| 2002/0075852 | A1* | 6/2002 | Preiss | H04L 12/5693 370/352 |
| 2002/0196790 | A1* | 12/2002 | Koistinen | H04L 12/2854 370/400 |
| 2011/0235632 | A1* | 9/2011 | Kim | G10L 19/173 370/352 |

* cited by examiner

METHOD AND APPARATUS FOR TRANSMITTING VOIP FRAME

CROSS-REFERENCE TO RELATED APPLICATION AND CLAIM OF PRIORITY

The present application is related to and claims the priority under 35 U.S.C. §119(a) to Korean Application Serial No. 10-2014-0025352, which was filed in the Korean Intellectual Property Office on Mar. 4, 2014, the entire content of which is hereby incorporated by reference.

TECHNICAL FIELD

The present disclosure relates to a method and an apparatus for transmitting a VoIP frame in a wireless LAN Access Point (AP) when a Voice over Internet Protocol (VoIP) service is provided in a Wireless Local Area Network (WLAN).

BACKGROUND

The VoIP technology enables voice communications through packet data based on an IP network such as the high-speed Internet, and is increasingly used as smartphones and the fourth generation mobile communications based on an IP such as Wi-Fi or LTE are spread.

In the VoIP service, it is important to transmit data at a predetermined interval for securing the service quality. However, when a VoIP service is used in a WLAN environment, it is difficult to constantly maintain a transmission interval of VoIP data due to scanning operations by a terminal and the characteristics of wireless data, and accordingly, the service quality may deteriorate.

According to the related art, jitter buffers are used to constantly maintain a transmission interval of VoIP data. A jitter buffer is generally installed in a wired or wireless client or a gateway, and the quality of a VoIP service is increased by reducing jitters generated on a network.

SUMMARY

A wireless LAN VoIP client based in a smartphone is manufactured in consideration of characteristics of a wireless LAN environment, and accordingly, has a sufficiently larger jitter buffer. However, because wired VoIP equipment, such as a media gateway, is manufactured in consideration of a wired environment, a jitter buffer having a relatively small size as compared with a jitter buffer required in a wireless LAN environment is used. Accordingly, when a jitter having a size larger than that of a jitter buffer of wired equipment is generated in a wireless LAN or network, all the continuous VoIP data may fail to be processed and may be lost, and thus service quality may deteriorate.

To address the above-discussed deficiencies, it is a primary object to provide a method and an apparatus for effectively reducing jitters generated in a wireless LAN environment by a wireless LAN AP in a wireless LAN environment when wired or wireless equipment is used in conjunction with a VoIP service.

The present disclosure also provides a method and an apparatus for effectively detecting a VoIP frame by a wireless AP to transmit the detected VoIP frame at a predetermined time interval.

In accordance with an aspect of the present disclosure, an apparatus for transmitting a Voice over Internet Protocol (VoIP) frame in a communication system is provided. The apparatus includes a frame detection unit that, if a new VoIP frame is input, identifies whether a buffer for eliminating a jitter generated in a wireless network is used, and stores the VoIP frame in a queue, a service time determination unit that determines whether the buffer is used, and if the buffer is used, and determines a time interval for transmitting the VoIP frame stored in the queue and a service start time for transmitting the VoIP frame; and a frame transmission unit that transmits the VoIP frame stored in the queue in a wired fashion based on the determined time interval and service start time.

In accordance with another aspect of the present disclosure, a method of transmitting a Voice over Internet Protocol (VoIP) by a wireless LAN Access Point (AP) in a communication system is provided. The method includes if a new VoIP frame is input, determining whether a buffer for eliminating a jitter generated in a wireless network is used, and storing the VoIP frame in a queue, determining whether the buffer is used, and if the buffer is used, determining a time interval for transmitting the VoIP frame stored in the queue and a service start time for transmitting the VoIP frame, and transmitting the VoIP frame stored in the queue in a wired fashion based on the determined time interval and service start time.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
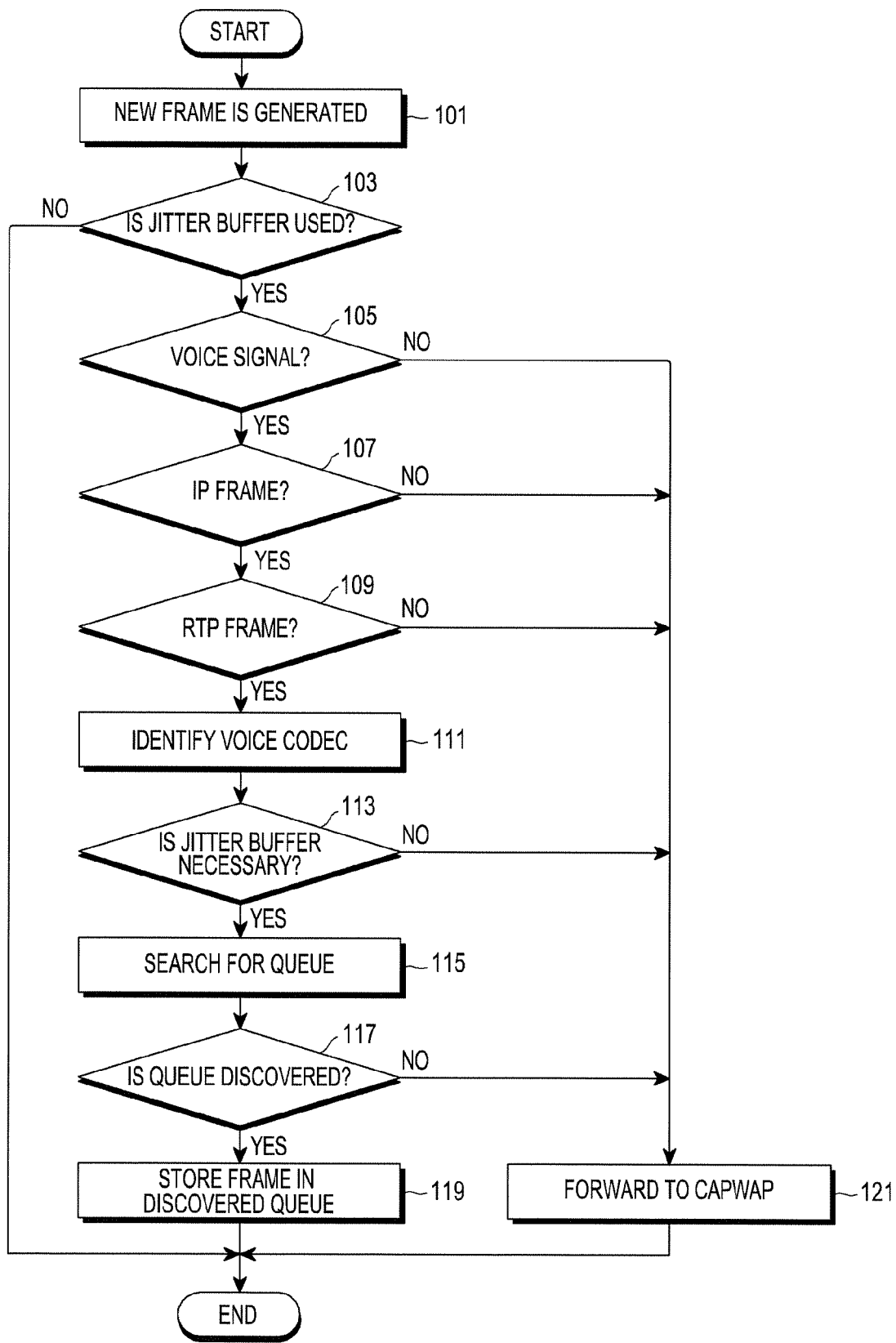
FIG. 1 is a flowchart illustrating a method of detecting a VoIP frame according to an embodiment of the present disclosure.

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. Hereinafter, an operational principle of embodiments of the present disclosure will be described in detail with reference to the accompanying drawings. Like reference numerals designate like components in the drawings where possible even though components are shown in different drawings. In the following description of the present disclosure, a detailed description of related known functions or configurations will be omitted so as not to obscure the subject of the present disclosure. The terms which will be described below are terms defined in consideration of the functions in the present disclosure, and may be different according to users, intentions of the users, or customs. Therefore, the definitions of the terms should be determined based on the contents throughout the specification.

In order to reduce jitters generated in a wireless network environment, the present disclosure detects a VoIP frame in a wireless LAN AP first, detects a time for which packet data of the detected VoIP frame will be serviced, and transmit packet data according to the determined time.

First, the embodiment of detecting a VoIP frame is described in detail below in association with FIG. 1. FIG. 1 is a flowchart illustrating a method of detecting a VoIP frame according to an embodiment of the present disclosure.

Referring to FIG. 1, if a new frame is generated in step 101, it is determined whether a jitter buffer function is used according to an embodiment of the present disclosure in step 103, and when a jitter buffer function is used, it is determined that the generated frame is a voice signal in step 105. The VoIP frame delivered from a WLAN includes at least one of a voice signal, a video signal, a best effort signal, and a background signal, and some embodiments according to the present disclosure delivers only a voice signal to the Ethernet by applying a jitter buffer. In the case of a voice signal, it is determined whether the generated frame is an IP frame in step 107, and if the generated frame is the IP frame, it is further determined whether the IP frame is a Real-time Transport Protocol (RTP). In the case of an RTP frame, a voice codec type is identified in step 111, and it is determined whether the identified voice codec still requires a jitter buffer in step 113. Then, the case in which a jitter buffer is not used according to a voice codec is considered. When the jitter buffer is necessary, a queue allocated to a terminal is discovered in step 115, and it is identified whether a queue is discovered in step 117. If a queue is discovered, the discovered queue is stored in the corresponding frame in step 119, and if the queue is not discovered, the corresponding frame is forwarded to a Control And Provisioning of Wireless Access Points (CAPWAP) in step 121.

Meanwhile, when a jitter buffer is determined not to be used in step 103, a frame detecting process is ended. If it is determined that the signal is not a voice signal, or the frame is not an IP frame or an RTP frame in steps 105, 107, and 109, the embodiment proceeds to step 121 in which the pending frame is forwarded to the CAPWAP bridge.

In some embodiments, a step 113 of determining whether a jitter buffer is necessary after the type of a voice codec is identified in step 111 can be omitted, if necessary.

Figure 2:
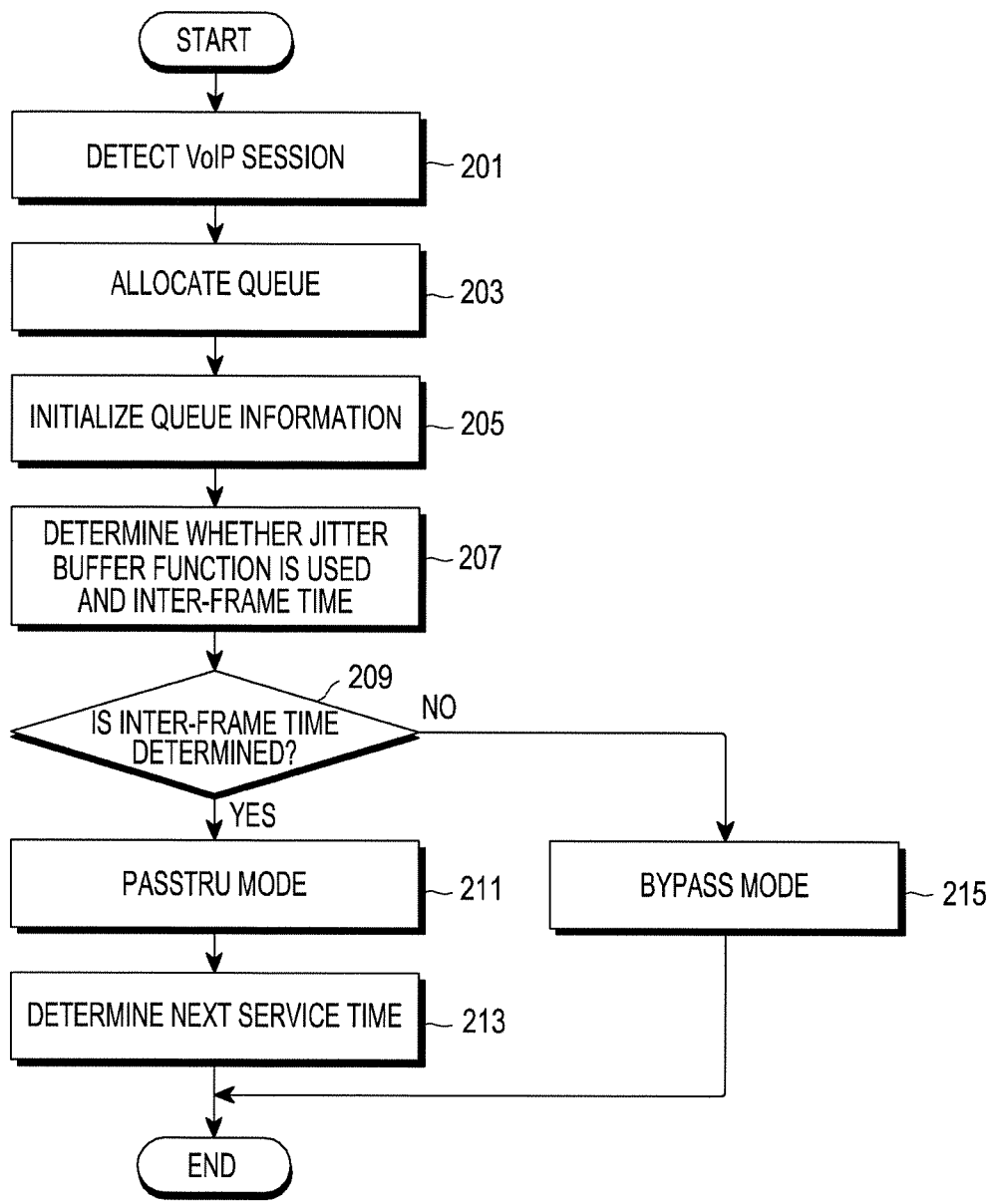
FIG. 2 is a flowchart illustrating a process of determining a service time for transmitting a frame in a wireless LAN AP that uses a jitter buffer.

Next, the embodiment of determining a service time is described in association with FIG. 2 below. FIG. 2 is a flowchart illustrating a process of determining a service time for transmitting a frame in a wireless LAN AP that uses a jitter buffer.

Referring to FIG. 2, if a new VoIP session is detected in step 201, a wireless LAN AP allocates an idle queue for the corresponding session in step 203, and initializes information on the allocated queue in step 205. Next, the wireless LAN AP determines whether a jitter buffer function is used and an inter-frame time with reference to signals transmitted to, and received from, the terminal in an RTP negotiation process step 207.

If an inter-frame time is determined according to whether a jitter buffer function is used in step 209, the transmission mode is set to a 'PASSTRU' mode for transmitting a packet through a jitter buffer in step 211 and a next service time for transmitting a packet is determined. The next service time can be determined as a value obtained by adding an initial latency to a current time, and the initial latency is an initial delay value set in a wireless LAN AP.

If an inter-frame time not determined as a jitter buffer function is not used in step 209, the transmission mode is set to a 'BYPASS' mode for directly transmitting a packet in step 215.

Next, an operation of transmitting a VoIP frame by a scheduler of a wireless AP will be described below.

The scheduler is operated as a scheduler timer driven for each predetermined schedule interval is expired. A timeout of a scheduler is renewed whenever a VoIP frame is stored in a queue or a VoIP frame stored in a queue is transmitted, the timeout is renewed to a value obtained by adding the timeout of the RTP protocol to the current time. However, because it means that the corresponding queue is not used for a RTP timeout if the current time is larger than a timeout of the scheduler, the corresponding queue allocated to the terminal is returned. Then, the corresponding queue is changed from an active state into an idle state, and can be allocated to another terminal.

Meanwhile, the frame stored in the queue can be transmitted to an uplink in an interval of an inter-frame time, and after the packet is transmitted to the uplink, the scheduler renews the next service time indicating a time for transmitting a packet in the following using an inter-frame time value. That is, the next service time is renewed to a value obtained by adding an inter-frame time to the current next service time. In this way, the next service time is renewed whenever the packet stored in the queue is transmitted, and accordingly, the wireless LAN AP can constantly transmit a VoIP frame at the same time interval of the inter-frame time.

Figure 3:
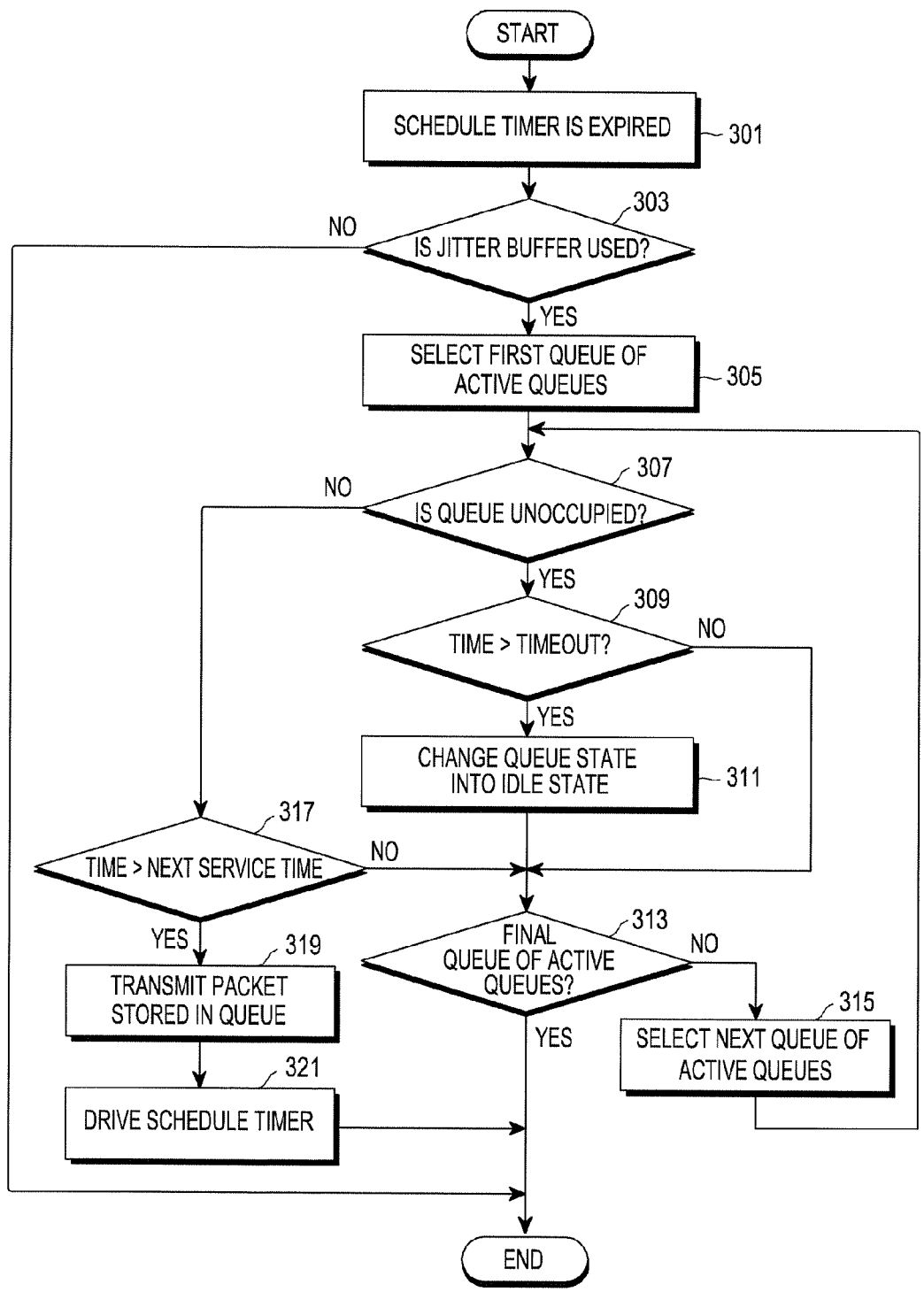
FIG. 3 is a flowchart illustrating a process of transmitting a packet stored in a queue according to an embodiment of the present disclosure.

FIG. 3 is a flowchart illustrating a process of transmitting a packet stored in a queue according to an embodiment of the present disclosure.

Referring to FIG. 3, the wireless LAN AP determines whether the schedule timer is expired in step 301, and determines whether a jitter buffer function is used in step 303. When a jitter buffer function is used, the first queue is selected from the active queues in step 305, and it is identified whether the corresponding queue is unoccupied in step 307. When the corresponding queue is unoccupied, it is identified whether the current time is larger than a timeout of the scheduler in step 309, and if the current time is larger than the timeout of the scheduler, a state of the corresponding queue is changed from an active state to an idle state in step 311. Furthermore, it is identified whether the corresponding queue is the final queue of the active queues in step 313, and in the case of the final queue, the scheduling operation is ended, and in the case of not being the final queue, the next queue is selected from the active queues in step 315 and the step returns to a process 307 of inspecting whether the queue is unoccupied.

When the queue is unoccupied in step 307, it means that there are packet data that will be transmitted, and accordingly, the current time and the next service time are compared for transmission of packet data in step 317. If the current time is larger than the next service time after the comparison, it means that the current time corresponds to a time for transmitting packet data stored in the queue, and accordingly, the packet data stored in the queue are transmitted to an uplink in step 319 and the next service time is renewed. Furthermore, the scheduler time is driven again (321). If the current time is smaller than the next service time after the comparison, it means that a time for transmission is not reached, and accordingly a process 313 of identifying whether the corresponding queue is the final queue of the active queues is performed.

Figure 4:
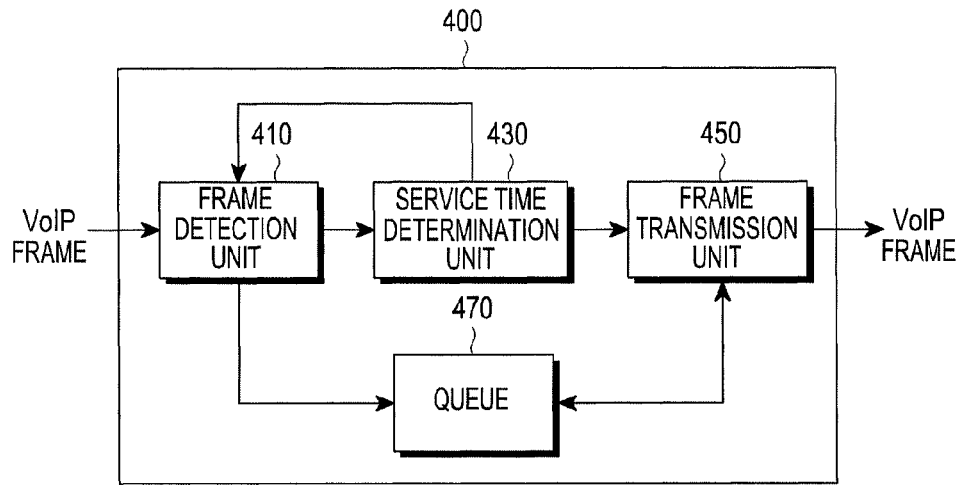
FIG. 4 is a diagram illustrating an apparatus for performing a jitter buffer function according to an embodiment of the present disclosure.

FIG. 4 is a diagram illustrating an apparatus for performing a jitter buffer function according to an embodiment of the present disclosure.

Referring to FIG. 4, the apparatus 400 for performing a jitter buffer function according to an embodiment of the present disclosure includes a frame detection unit (or frame detector) 410, a service time determination unit 430, a frame transmission unit (or frame transmitter) 450, and a queue 470. In some embodiments, at least one of the frame detection unit 410, the service time determination unit 430, the frame transmission unit 450, and the queue 470 can be implemented within one or more application specific integrated circuits (ASICs), digital signal processors (DSPs), digital signal processing devices (DSPDs), programmable logic devices (PLDs), field programmable gate arrays (FPGAs), processors, controllers, other electronic units designed to perform the functions described herein, or a selective combination thereof. The controllers can comprise any conventional control means such as relay technology, ASICs, FPGA, programmable micro-controllers and microprocessors. The apparatus can be a mobile terminal including a receiver for receiving a VoIP frame from a network and a transmitter for transmitting the VoIP frame to a network after being processed.

The apparatus of the embodiments of the present disclosure can adopt any suitable wireless transceiver structures, such as that of the user equipment described in U.S. patent Ser. No. 14/176,919, which was published as U.S. Patent Publication No. US20140242963, the disclosure of which is incorporated by reference in its entirety.

If a new frame is input, the frame detection unit 410 determines whether a jitter buffer function according to an embodiment of the present disclosure is used, and if it is determined that the jitter buffer function is used, the category of the input frame is sorted. The VoIP frame delivered from a WLAN includes a voice signal, a video signal, a best effort signal, and a background signal, and the present disclosure delivers only a voice signal to the Ethernet by applying a jitter buffer. When the input frame corresponds to a voice signal, it is identified whether the input frame is an IP frame and, if the input frame is an IP frame, it is identified again whether the input frame is an RTP frame. In the case of an RTP frame, a voice codec type is identified, and it is identified whether the identified voice codec still requires a jitter buffer. When a jitter buffer is necessary, a queue allocated to the terminal is searched for, and if a queue is discovered, a frame input to the discovered queue 470 is stored. Then, the discovered queue is changed from an idle state to an active state.

The service time determination unit 430 initializes information on the queue 470 allocated to the terminal. Next, it is determined whether a jitter buffer function is used as well as an inter-frame time with reference to signals transmitted to and received from the terminal in an RTP negotiation process. The frame detection unit 410 and the frame transmission unit 450 are informed of the determination of whether a jitter buffer is used. As the jitter buffer function is used, a transmission mode is determined if an inter-frame time is determined. When the jitter buffer function is used, a next service time for transmitting a packet is determined after the mode is set to a 'PASSTRU' mode for transmitting a packet through a jitter buffer, and the determined time is delivered to the frame transmission unit 450. The next service time can be determined by a value obtained by adding an initial latency to the current time. When the jitter buffer function is not used, the transmission mode is set to a 'BYPASS' mode for directly transmitting a packet. The determined transmission mode is delivered to the frame transmission unit 450.

The frame transmission unit 450 performs an operation for transmitting a frame whenever the schedule timer is expired. That is, if the schedule timer is expired, the frame transmission unit 450 identifies whether the jitter buffer function is used. When the jitter buffer function is used, it is identified whether packet data that will be transmitted to the corresponding queue are present in the first queue of the active queues, and the following queues, in sequence.

When there are present packet data that will be transmitted, the current time and the next service time are compared for transmission of packet data, and if the current time is larger than the next service time, the current time corresponds to a time for transmitting the packet data stored in the queue, and accordingly, the packet data stored in the queue are transmitted to an uplink and the schedule timer is driven again. Accordingly, the next service time is renewed to a value obtained by adding a schedule interval to the current time. Furthermore, if the current time is smaller than the next service time, it means that the transmission time is not reached yet, and accordingly, the packet data are not transmitted.

Meanwhile, when there is presently no data that will be transmitted to the corresponding queue, it is identified whether the current time is larger than a timeout of the scheduler, and if the current time is larger than the timeout of the scheduler, it means that the corresponding queue is not used for the RPT timeout of the corresponding queue, and accordingly, the state of the corresponding queue is changed from an active state to an idle state.

As described above, according to the present disclosure, VoIP frames can be transmitted at a regular time interval by reflecting the characteristics of a WLAN environment and a wireless network and thus applying a jitter buffer to a location of a wireless LAN AP where a jitter occurs, and accordingly, the quality of a VoIP service can be improved.

Figure 5:
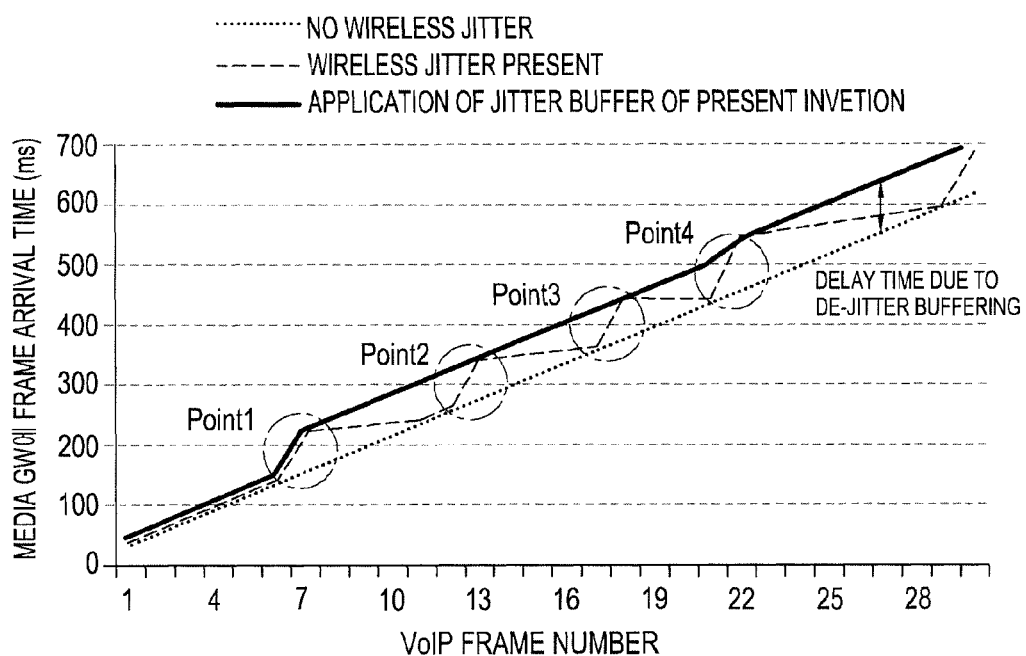
FIG. 5 is a graph illustrating a result obtained by applying a jitter buffer function according to an embodiment of the present disclosure.

FIG. 5 is a graph illustrating a result obtained by applying a jitter buffer function according to an embodiment of the present disclosure. Referring to FIG. 5, when a jitter buffer function according to an embodiment of the present disclosure is applied, it may be identified that a time interval at which frames are received in a medial gateway is similar to

What is claimed is:

1. An apparatus for transmitting voice over internet protocol (VoIP) frames, the apparatus comprising:
   a buffer for reducing a jitter;
   a controller configured to, if frames are received from a terminal connected with the apparatus through a wireless link, determine whether the buffer is being used;
   determine whether the frames comprise a voice signal in internet protocol (IP) frame based on a real-time transport protocol (RTP) if the buffer is being used;
   determine whether it is necessary to use the buffer based on a voice codec used in the frames if the frames comprise the voice signal in IP frame based on the RTP, and search for the buffer if it is necessary to use the buffer;
   store the frames comprising the voice signal in IP frame based on the RTP in the searched buffer;
   determine a time interval for transmitting the frames stored in the searched buffer and a service start time for transmitting the frames; and
   transmit the frames stored in the searched buffer to a device connected with the apparatus through a wired link based on the determined time interval and service start time.

2. The apparatus of claim 1, wherein the controller is configured to determine whether the buffer is used and the time interval based on signals transmitted and received in a process of RTP negotiation with the terminal.

3. The apparatus of claim 2, wherein the service start time determined by a value obtained by adding an initial delay value for frame reception of the apparatus to a current time.

4. The apparatus of claim 1, wherein the service start time determined by a value obtained by adding an initial delay value for frame reception of the apparatus to a current time.

5. The apparatus of claim 1, wherein the controller is further configured to determine whether the buffer is used if a new session is generated.

6. The apparatus of claim 1, wherein if the service start time is reached, the controller is further configured to renew the service start time after transmitting the frames stored in the searched buffer.

7. The apparatus of claim 6, wherein the service start time is renewed to have a value obtained by adding the time interval to a current service start time.

8. A method for transmitting voice over internet protocol (VoIP) frames by a wireless access point (AP) in a communication system, the method comprising:
   if frames are received from a terminal connected with the AP through a wireless link, determining whether a buffer for reducing a jitter is being used;
   determining whether the frames comprise a voice signal in internet protocol (IP) frame based on a real-time transport protocol (RTP) if the buffer is being used;
   determining whether it is necessary to use the buffer based on a voice codec used in the frames if the frames comprise the voice signal in IP frame based on the RTP, and searching for the buffer if it is necessary to use the buffer;
   storing the frames comprising the voice signal in IP frame based on the RTP in the searched buffer;
   determining a time interval for transmitting the frames stored in the searched buffer and a service start time for transmitting the frames; and
   transmitting the frames stored in the searched buffer to a device connected with the AP through a wired link based on the determined time interval and service start time.

9. The method of claim 8, wherein in the determination of whether the buffer is used and the time interval, whether the buffer is used and the time interval are determined based on signals transmitted and received in a process of RTP negotiation with the terminal.

10. The method of claim 9, wherein the service start time determined by a value obtained by adding an initial delay value for frame reception of the wireless access point (AP) to a current time.

11. The method of claim 8, wherein the service start time determined by a value obtained by adding an initial delay value for frame reception of the wireless access point (AP) to a current time.

12. The method of claim 8, wherein determining whether the buffer is used is performed if a new session is generated.

13. The method of claim 12, wherein the service start time is renewed to have a value obtained by adding the time interval to a current service start time.

14. The method of claim 8, further comprising, if the service start time is reached, renewing the service start time after transmitting the frames stored in the searched buffer.

* * * * *